US012067954B2

(12) United States Patent
 Shiibayashi (10) Patent No.: US 12,067,954 B2
(45) Date of Patent: Aug. 20, 2024

(54) DISPLAY DRIVER, SEMICONDUCTOR DEVICE, AND AMPLIFIER CIRCUIT HAVING A RESPONSE-SPEED INCREASE CIRCUIT

(71) Applicant: LAPIS Semiconductor Co., Ltd., Yokohama (JP)

(72) Inventor: Kenichi Shiibayashi, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 17/622,784

(22) PCT Filed: Jun. 17, 2020

(86) PCT No.: PCT/JP2020/023755
§ 371 (c)(1),
(2) Date: Dec. 24, 2021

(87) PCT Pub. No.: WO2020/262142
PCT Pub. Date: Dec. 30, 2020

(65) Prior Publication Data
US 2022/0246109 A1  Aug. 4, 2022

(30) Foreign Application Priority Data
Jun. 27, 2019 (JP) .................. 2019-120026

(51) Int. Cl.
 *G09G 3/36* (2006.01)
 *G09G 3/3258* (2016.01)
(52) U.S. Cl.
 CPC ......... *G09G 3/3696* (2013.01); *G09G 3/3258* (2013.01); *G09G 3/3648* (2013.01);
(Continued)

(58) Field of Classification Search
 CPC ......... G09G 3/20–2011; G09G 3/2092; G09G 3/2096; G09G 3/3258;
(Continued)

(56) References Cited

U.S. PATENT DOCUMENTS 5,399,992 A    3/1995  Itakura et al.
2002/0186231 A1* 12/2002 Kudo ................... G09G 3/2092
                                                        345/690
(Continued)

FOREIGN PATENT DOCUMENTS

JP    H04356816 A   12/1992
JP    H10177367 A    6/1998
(Continued)

*Primary Examiner* — Keith L Crawley
(74) *Attorney, Agent, or Firm* — Rabin & Berdo, P.C.

(57) ABSTRACT

A voltage generation unit includes first to k-th amplifiers that individually receiving first to k-th reference voltages having mutually different voltage values, individually amplify these reference voltages with gain 1, and output the reference voltages. The generation unit generates plural gradation voltages by dividing voltages between respective voltages output from the first to k-th amplifiers. A decoder unit selects one gradation voltage corresponding to the luminance level represented by the pixel data piece among the gradation voltages and generates a signal having the one gradation voltage as the drive signal for driving a display device. Each amplifier includes a response-speed increase circuit that includes at least one transistor in which a source and a back gate are connected to an output terminal of the amplifier, a predetermined electric potential is applied to a drain, and the reference voltage received by the amplifier is received at a gate.

6 Claims, 7 Drawing Sheets

(52) U.S. Cl.
CPC ............... *G09G 2310/0286* (2013.01); *G09G 2310/0291* (2013.01); *G09G 2320/0252* (2013.01); *G09G 2320/0276* (2013.01); *G09G 2320/0626* (2013.01)

(58) Field of Classification Search
CPC ..... G09G 3/3275–3291; G09G 3/3611; G09G 3/3648; G09G 3/3685–3696; G09G 2310/0243; G09G 2310/0264–027; G09G 2310/0286–0294; G09G 2320/0233; G09G 2320/0252; G09G 2320/0271; G09G 2320/0276; G09G 2320/0626; G09G 2330/028
See application file for complete search history.

(56) References Cited

U.S. PATENT DOCUMENTS

| | | | |
|---|---|---|---|
| 2004/0075500 | A1 | 4/2004 | Inokuchi |
| 2005/0052395 | A1 | 3/2005 | Choi et al. |
| 2006/0279498 | A1* | 12/2006 | Kaneda ................ G09G 3/3696 345/89 |
| 2009/0009537 | A1* | 1/2009 | Shimatani ............ G09G 3/3696 345/690 |
| 2009/0289930 | A1 | 11/2009 | Nishimura |
| 2011/0175942 | A1* | 7/2011 | Ahn ..................... G09G 3/3688 345/690 |
| 2012/0086697 | A1* | 4/2012 | Hasegawa ............ G09G 3/3688 345/212 |
| 2014/0218111 | A1* | 8/2014 | Lin ..................... H03F 3/45076 330/253 |
| 2015/0222252 | A1* | 8/2015 | Kim ..................... H03F 3/3022 327/307 |
| 2016/0071479 | A1* | 3/2016 | Shiibayashi ......... G09G 3/3688 345/212 |

FOREIGN PATENT DOCUMENTS

| | | |
|---|---|---|
| JP | H11112247 A | 4/1999 |
| JP | 2004140487 A | 5/2004 |
| JP | 2005115365 A | 4/2005 |
| JP | 2010041368 A | 2/2010 |
| JP | 2012137783 A | 7/2012 |

* cited by examiner

DISPLAY DRIVER, SEMICONDUCTOR DEVICE, AND AMPLIFIER CIRCUIT HAVING A RESPONSE-SPEED INCREASE CIRCUIT

TECHNICAL FIELD

The present invention relates to a display driver that drives a display device in response to an image signal, a semiconductor device in which the display driver is formed, and an amplifier circuit.

BACKGROUND ART

A display apparatus that includes a display panel as a display device includes a display driver that includes a gradation voltage generation circuit and a decoder below together with the display panel. The gradation voltage generation circuit generates 64 gradation voltages representing a luminance level in 64 gradations, and the decoder selects one gradation voltage corresponding to display data from these 64 gradation voltages and supply it to a signal line of the display panel (see, for example, Patent Document 1).

The gradation voltage generation circuit includes a plurality of operational amplifiers as gamma buffers that each receive a voltage according to a desired gamma characteristic and amplify it with a gain 1, and a ladder resistor that generates the 64 gradation voltages by dividing the voltages between the output voltages of the respective operational amplifiers.

Patent Document 1: JP-A-2012-137783

DISCLOSURE OF THE INVENTION

Problems to be Solved by the Invention

Recently, because of reduction of one horizontal scanning period in accordance with larger screens and high definition of display apparatuses, high speed processing in the display driver is desired. That is, it is necessary to cause a voltage value of a gradation voltage output from a decoder to reach a target voltage value corresponding to display data in a period of elapsing the one horizontal scanning period from a time point at which display data supplied to the decoder switches to display data of next one horizontal scanning period.

Incidentally, when the display data supplied to the decoder switches to the display data corresponding to the next one horizontal scanning period, in accordance with this, the current flowing in the decoder temporarily significantly increase or decrease in some cases. Accordingly, the voltage value of the gradation voltage supplied to the decoder from the gradation voltage generation circuit temporarily decreases or increases. That is, in association with the fluctuation of the current flowing in the decoder as a load of the gradation voltage generation circuit, what is called a load change, the voltage value of the gradation voltage that is originally to be maintained to a constant voltage value fluctuates.

Therefore, for example, when the voltage value of the gradation voltage temporarily decreases, a time taken for reaching of the voltage value of the gradation voltage output from the decoder to the target voltage value corresponding to the display data is lengthened by a length of the time necessary for returning of the decreased voltage value to the original voltage value. Accordingly, when the one horizontal scanning period is shortened, the voltage value of the gradation voltage output from the decoder cannot reach the target voltage value within the one horizontal scanning period, thus possibly causing an image degradation.

Therefore, to quickly suppress the voltage fluctuation of the gradation voltage, it is considered to increase an operating current in a gamma buffer (operational amplifier). However, a problem occurs in that a characteristic degradation is caused by the increase of power consumption and the increase of heat generation amount in accordance with the increase of operating current.

The increase of the operating current in the gamma buffer reduces an operation margin to a saturation region of the transistor at low-voltage. Therefore, to compensate this, it is necessary to increase a gate width of each transistor constituting the gamma buffer, and problems of increased chip size and cost increase also occur.

Accordingly, it is an object of the present invention to provide a display driver, a semiconductor device, and an amplifier circuit that allow driving a display device at high speed while suppressing increase of a heat generation amount, a power consumption, and a device scale.

Solutions to the Problems

A display driver according to the present invention is a display driver that generates a drive signal for driving a display device in response to a pixel data piece that represents a luminance level of each pixel based on a video signal. The display driver includes a gradation voltage generation unit and a decoder unit. The gradation voltage generation unit includes first to k-th (k is an integer of 2 or more) amplifiers to which first to k-th reference voltages having mutually different voltage values are individually input. The first to k-th amplifiers amplify the first to k-th reference voltages and output the amplified first to k-th reference voltages. The gradation voltage generation unit generates a plurality of gradation voltages by dividing the voltages between the respective voltages output from the first to k-th amplifiers. The decoder unit selects one gradation voltage corresponding to the luminance level represented by the pixel data piece among the plurality of gradation voltages and generates a signal having the one gradation voltage as the drive signal. The gradation voltage generation unit includes a plurality of response-speed increase circuits connected to the respective first to k-th amplifiers. The response-speed increase circuit includes at least one transistor in which a source and a back gate are connected to an output terminal of the amplifier, a predetermined electric potential is applied to a drain, and the reference voltage input to the amplifier is applied to a gate.

A semiconductor device according to the present invention is a semiconductor device that includes a display driver. The display driver generates a drive signal for driving a display device in response to a pixel data piece that represents a luminance level of each pixel based on a video signal. The display driver includes a gradation voltage generation unit and a decoder unit. The gradation voltage generation unit includes first to k-th (k is an integer of 2 or more) amplifiers to which first to k-th reference voltages having mutually different voltage values are individually input. The first to k-th amplifiers amplify the first to k-th reference voltages and output the amplified first to k-th reference voltages. The gradation voltage generation unit generates a plurality of gradation voltages by dividing the voltages between the respective voltages output from the first to k-th amplifiers. The decoder unit selects one gradation voltage corresponding to the luminance level represented by the pixel data piece among the plurality of gradation voltages and generates a signal having the one gradation voltage as the drive signal. The gradation voltage generation unit includes a plurality of response-speed increase circuits connected to the respective first to k-th amplifiers. The response-speed increase circuit includes at least one transistor in which a source and a back gate are connected to an output terminal of the amplifier, a predetermined electric potential is applied to a drain, and the reference voltage input to the amplifier is applied to a gate.

An amplifier circuit according to the present invention includes an operational amplifier, an n-channel MOS transistor, and a p-channel MOS transistor. In the operational amplifier, an inverting input terminal is connected to an output terminal of the operational amplifier itself. The operational amplifier receives an input voltage by a non-inverting input terminal. In the n-channel MOS transistor, a source and a back gate are connected to the output terminal of the operational amplifier, a power supply potential is applied to a drain, and the input voltage is applied to a gate. In the p-channel MOS transistor, a source and a back gate are connected to the output terminal of the operational amplifier, a ground potential is applied to a drain, and the input voltage is applied to a gate.

Advantageous Effects of the Invention

In the display driver according to the present invention, the gradation voltage generation unit includes the first to k-th (k is an integer of 2 or more) amplifiers that amplify the plurality of reference voltages, and generates a plurality of gradation voltages by dividing the voltages between the voltages output from the respective amplifiers. The gradation voltage generation unit includes the response-speed increase circuit below. That is, each of the amplifiers includes the response-speed increase circuit that includes at least one transistor in which a source and a back gate are connected to an output terminal of the amplifier, a predetermined electric potential is applied to a drain, and the reference voltage received by the amplifier is received at a gate.

Thus, when a difference between the reference voltage input to the amplifier and the output voltage of this amplifier, that is, a fluctuation amount of the output voltage becomes larger than the threshold of the transistor, the transistor turns ON. That is, during this period, the transistor applies a predetermined electric potential to the output terminal of the amplifier, thereby causing the output terminal to charge or discharge the electric charge. Therefore, the amount of the voltage fluctuation of the output voltage of the amplifier is suppressed, and the amount of the fluctuation of the gradation voltage generated based on the output voltage is reduced in accordance with it, thus increasing the speed of rising or falling of the level of the drive signal that is generated using the gradation voltage and drives the display device.

Accordingly, the response-speed increase circuit allows suppressing increase of a heat generation amount, a power consumption, and a device scale compared with a case where an internal current of an amplifier is increased to reduce the fluctuation of an output voltage of the amplifier.

DESCRIPTION OF PREFERRED EMBODIMENTS

The following describes embodiments of the present invention in detail with reference to the drawings.

Figure 1:
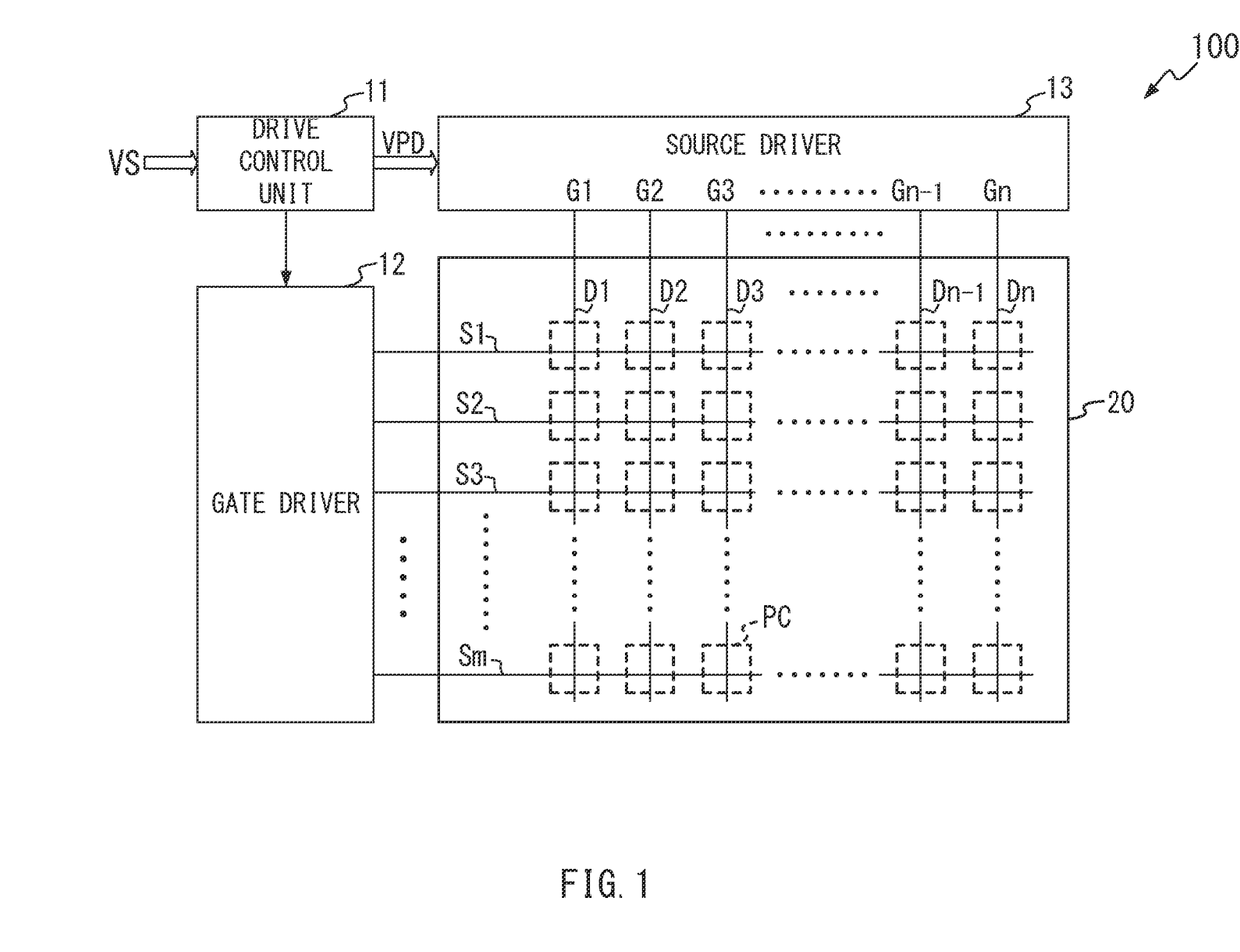
FIG. 1 is a block diagram illustrating a configuration of a display apparatus that includes a display driver according to the present invention.

FIG. 1 is a block diagram illustrating a configuration of a display apparatus 100 that includes a display driver according to the present invention. As illustrated in FIG. 1, the display apparatus 100 includes a drive control unit 11, a gate driver 12, a source driver 13, and a display device 20 including a liquid crystal or organic EL panel.

The display device 20 includes m (m is an integer of 2 or more) horizontal scanning lines Si to Sm each extending in a horizontal direction of a two-dimensional screen and n (n is an integer of 2 or more) source lines D1 to Dn each extending in a perpendicular direction of the two-dimensional screen. Furthermore, regions of intersections between the horizontal scanning lines S and the source lines D (regions surrounded by dashed lines) each include a display cell PC that serves as a pixel.

The drive control unit 11 receives an input video signal VS, and generates a series of pixel data PD representing a luminance level of a pixel for each pixel by, for example, 6-bit data and a horizontal synchronization signal based on the input video signal VS. The drive control unit 11 supplies the horizontal synchronization signal to the gate driver 12 and generates a video data signal VPD including clock information corresponding to the series of pixel data PD and the horizontal synchronization signal described above to supply this to the source driver 13.

The gate driver 12 generates a gate pulse in synchronization with the horizontal synchronization signal supplied from the drive control unit 11, and applies this to each of the horizontal scanning lines Si to Sm of the display device 20 in order.

The source driver 13 generates pixel drive signals G1 to Gn corresponding to the source lines D1 to Dn of the display device 20, respectively based on the video data signal VPD, and individually supplies them to the corresponding source lines D1 to Dn. The source driver 13 is formed in a single semiconductor chip or divided in a plurality of semiconductor chips.

Figure 2:
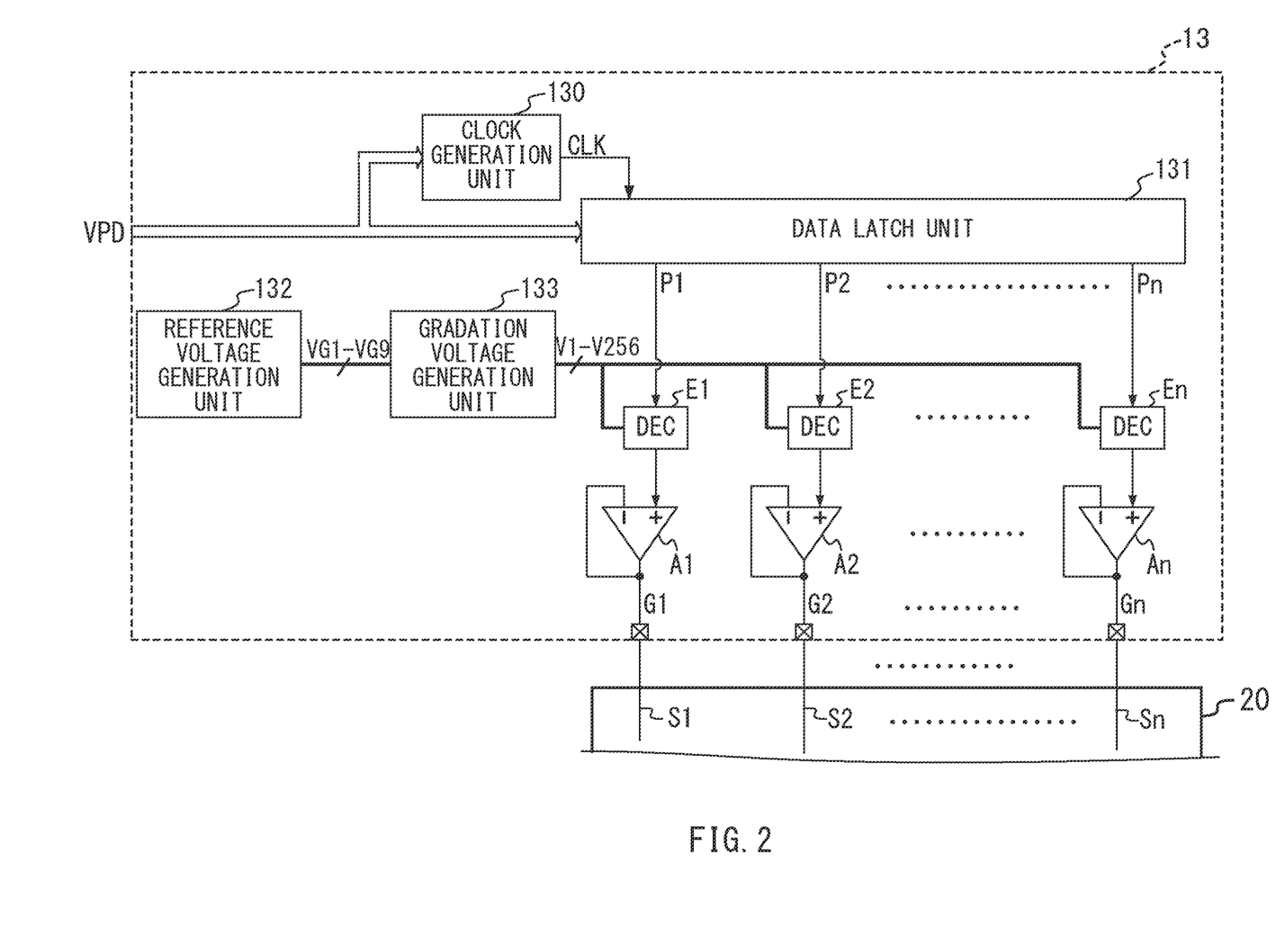
FIG. 2 is a block diagram illustrating an internal configuration of a source driver.

FIG. 2 is a block diagram illustrating an internal configuration of the source driver 13.

As illustrated in FIG. 2, the source driver 13 includes a clock generation unit 130, a data latch unit 131, a reference voltage generation unit 132, a gradation voltage generation unit 133, decoders E1 to En, and output amplifiers A1 to An.

The clock generation unit 130 generates a clock signal CLK in which one pulse appears for each horizontal scanning period based on the clock information included in the video data signal VPD, and supplies it to the data latch unit 131.

The data latch unit 131 sequentially retrieves the series of the pixel data PD included in the video data signal VPD. At this time, every time when the pixel data PD of one horizontal scanning line (n) is retrieved, the data latch unit 131 supplies the n pixel data PD as pixel data P1 to Pn to the decoders E1 to En, respectively at a timing synchronized with the clock signal CLK.

The reference voltage generation unit 132 generates nine direct-current voltages according to an inverse gamma characteristic to a gamma characteristic of the display device 20 as reference voltages VG1 to VG9, and supplies them to the gradation voltage generation unit 133.

The respective voltage values of the reference voltages VG1 to VG9 have, for example, a magnitude relationship below.

$$VG1<VG2<VG3<VG4<VG5<VG6<VG7<VG8<VG9$$

The gradation voltage generation unit 133 generates gradation voltages V1 to V256 representing the luminance level that can be displayed by the display device 20 in 256 gradations based on the reference voltages VG1 to VG9, and supplies them to each of the decoders E1 to En.

Each of the decoders E1 to En selects at least one gradation voltage corresponding to the luminance level represented by the pixel data P received by itself among the gradation voltages V1 to V256, and outputs it.

Each of the output amplifiers A1 to An is, for example, a voltage follower circuit that includes, what is called an operational amplifier in which its own output terminal is connected to its own inverting input terminal (−).

The output amplifiers A1 to An receive the gradation voltages output from the decoders E1 to En by their non-inverting input terminal (+), respectively, and output the currents corresponding to the gradation voltages received by them to their own output terminals, thus generating the pixel drive signals G1 to Gn corresponding to the gradation voltages, respectively. The pixel drive signals G1 to Gn are supplied to source lines S1 to Sn of the display device 20 via external terminals of the semiconductor chip.

Figure 3:
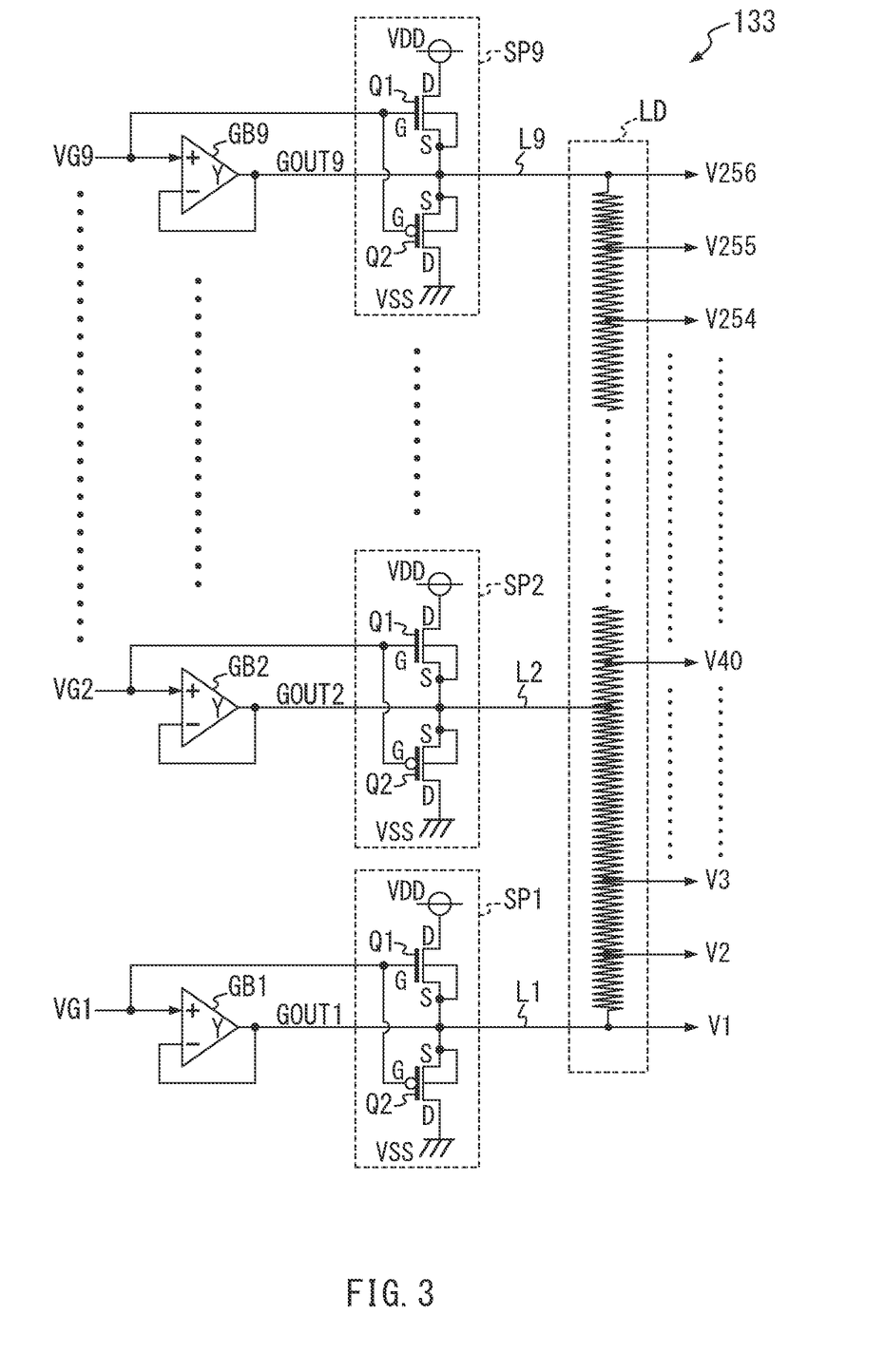
FIG. 3 is a circuit diagram illustrating an exemplary internal configuration of a gradation voltage generation unit.

FIG. 3 is a circuit diagram illustrating an exemplary internal configuration of the gradation voltage generation unit 133. As illustrated in FIG. 3, the gradation voltage generation unit 133 includes gamma buffers GB1 to GB9, response-speed increase circuits SP1 to SP9, and a ladder resistor LD.

Each of the gamma buffers GB1 to GB9 includes, for example, an operational amplifier.

Figure 4:
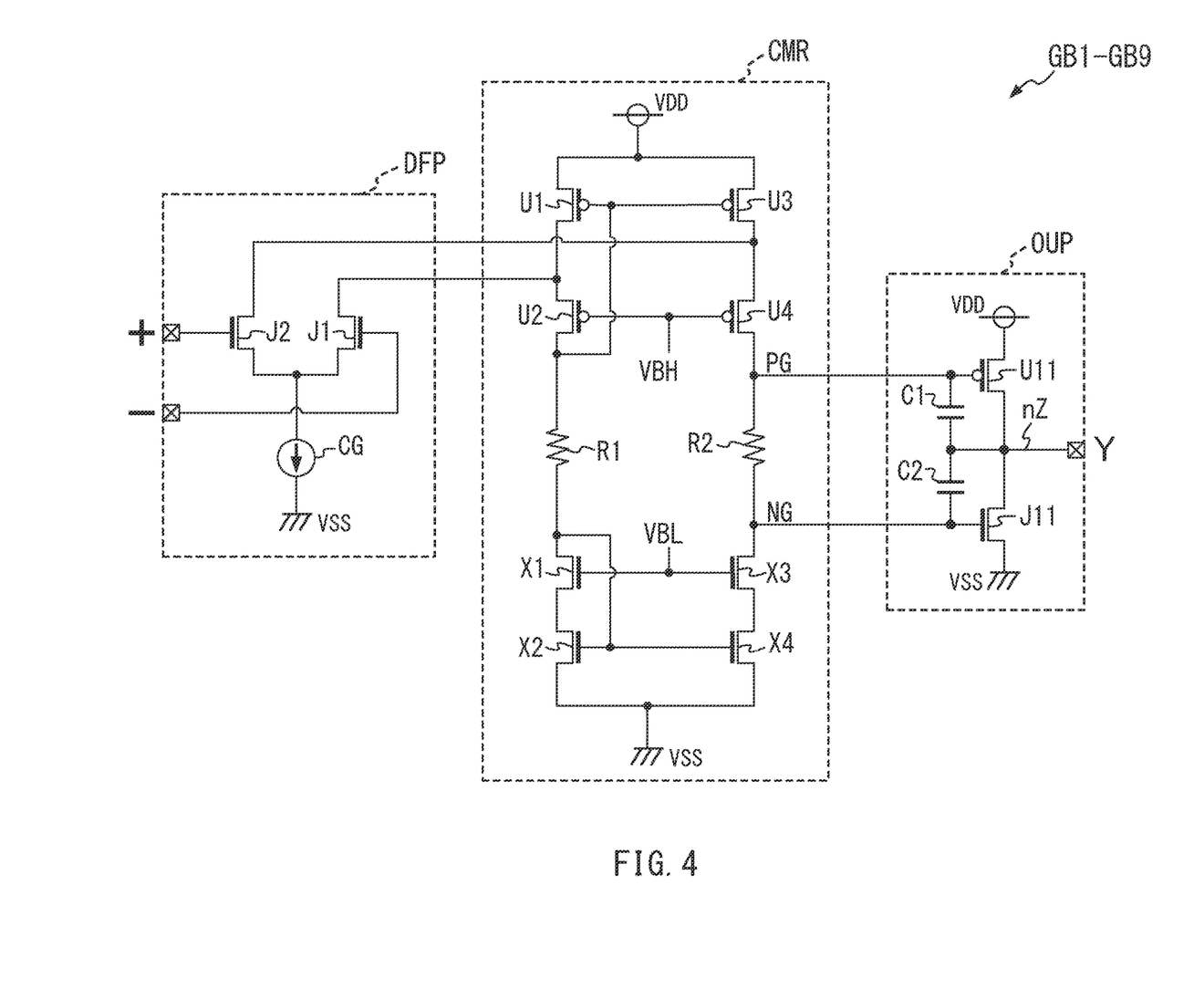
FIG. 4 is a circuit diagram illustrating an exemplary internal configuration of a gamma buffer.

FIG. 4 is a circuit diagram illustrating an exemplary internal configuration of each of the gamma buffers GB1 to GB9 as the operational amplifiers.

As illustrated in FIG. 4, each of the gamma buffers GB1 to GB9 includes a differential stage DFP, a current mirror stage CMR, and an output stage OUP.

The differential stage DFP includes n-channel metal oxide semiconductor (MOS) type transistors J1 and J2, and a current source CG.

The differential stage DFP extracts a first current corresponding to an electric potential applied to an inverting input terminal (−) from a primary side current path of the current mirror stage CMR, and extracts a second current corresponding to an electric potential applied to a non-inverting input terminal (+) from a secondary side current path of the current mirror stage CMR. In the differential stage DFP, a predetermined constant current generated by the current source CG is divided into two with a ratio between the electric potential applied to the non-inverting input terminal (+) and the electric potential applied to the inverting input terminal (−), and the divided two currents serve as the respective first and second currents described above.

The current mirror stage CMR includes p-channel MOS transistors U1 and U2, a resistor R1, and n-channel MOS transistors X1 and X2, which constitute the primary side current path, and p-channel MOS transistors U3 and U4, a resistor R2, and n-channel MOS transistors X3 and X4, which constitute the secondary side current path.

In the current mirror stage CMR, a voltage corresponding to a difference between the electric potentials applied to the respective inverting input terminal (−) and non-inverting input terminal (+) is generated in the resistor R2. At this time, the electric potential at one end of the resistor R2 as a positive driving potential PG and the electric potential at the other end as a negative driving potential NG are supplied to the output stage OUP.

The output stage OUP includes a p-channel MOS transistor U11, an n-channel MOS transistor J11, and capacitors C1 and C2 for phase compensation.

The transistor U11 of the output stage OUP delivers the current corresponding to the positive driving potential PG to an output terminal Y, and the transistor J11 extracts the current corresponding to the negative driving potential NG from the output terminal Y toward the ground potential VSS.

Here, each of the gamma buffers GB1 to GB9, which includes the operational amplifier having the internal configuration as illustrated in FIG. 4, includes, what is called a voltage follower circuit in which its own inverting input terminal (−) is connected to its own output terminal Y as illustrated in FIG. 3.

The gamma buffers GB1 to GB9 individually receives the reference voltages VG1 to VG9 supplied from the reference voltage generation unit 132 by the respective non-inverting input terminals (+). The output terminals Y of the gamma buffers GB1 to GB9 are individually connected to voltage supply lines L1 to L9, respectively, and connected to different first to ninth connection points at nine positions of the ladder resistor LD via the voltage supply lines L1 to L9.

The gamma buffer GB1 generates a voltage obtained by amplifying the reference voltage VG1 with the gain 1 as a gamma reference voltage GOUT1, and applies it to the voltage supply line L1 via its own output terminal Y. Accordingly, the gamma reference voltage GOUT1 is applied to the first connection point of the ladder resistor LD via the voltage supply line L1.

The gamma buffer GB2 generates a voltage obtained by amplifying the reference voltage VG2 with the gain 1 as a gamma reference voltage GOUT2, and applies it to the voltage supply line L2 via its own output terminal Y. Accordingly, the gamma reference voltage GOUT2 is applied to the second connection point of the ladder resistor LD via the voltage supply line L2.

Similarly, the gamma buffer GB(i) (i is an integer of 3 to 9) generates a voltage obtained by amplifying the reference voltage VG(i) with the gain 1 as a gamma reference voltage GOUT(i), and applies it to the (i)-th connection point of the ladder resistor LD via the voltage supply line L(i).

The ladder resistor LD generates the gradation voltages V1 to V256 having the mutually different voltage values by dividing the voltages between the respective gamma reference voltages GOUT1 to GOUT9. In this embodiment, among the gradation voltages V1 to V256, for example, the gradation voltage V256 has the largest voltage value corresponding to the highest luminance level, and the gradation voltage V1 has the smallest voltage value corresponding to the lowest luminance level. In the configuration illustrated in FIG. 3, the gamma reference voltage GOUT1 directly serves as the lowest gradation voltage V1, and the gamma reference voltage GOUT9 directly serves as the largest gradation voltage V256.

Here, the gamma buffers GB1 to GB9 are respectively provided with the response-speed increase circuits SP1 to SP9 that increase response speeds of the pixel drive signals G1 to Gn to the change of the pixel data for each horizontal scanning period by suppressing the amounts of voltage fluctuation of the gamma reference voltages GOUT1 to GOUT9.

As illustrated in FIG. 3, for example, the response-speed increase circuits SP1 to SP9 have the same internal configuration, and each include an n-channel MOS transistor Q1 and a p-channel MOS transistor Q2.

The following describes the internal configuration of the response-speed increase circuit SP2 extracted from the response-speed increase circuits SP1 to SP9.

As illustrated in FIG. 3, the transistor Q1 has a drain to which a power supply potential VDD is applied, and has a gate to which the reference voltage VG2 is applied. The transistor Q1 has a back gate and a source connected to the output terminal Y of the gamma buffer GB2 via the voltage supply line L2.

The transistor Q2 has a drain to which the ground potential VSS is applied, and has a gate to which the reference voltage VG2 is applied. The transistor Q2 has a back gate and a source connected to the terminal Y of the gamma buffer GB2 via the voltage supply line L2.

That is, as illustrated in FIG. 3, the gradation voltage generation unit 133 includes the amplifier circuits for each of the reference voltages, and the amplifier circuit includes the operational amplifier (for example, GB1) in which the inverting input terminal (−) is connected to its own output terminal Y and the input voltage (for example, VG1) is received by the non-inverting input terminal (+) and the response-speed increase circuit (for example, SP1) below.

Each of the response-speed increase circuits include the n-channel MOS transistor and the p-channel MOS transistor below. That is, in the n-channel MOS transistor (Q1), its own source and back gate are connected to the output terminal (Y) of the operational amplifier (for example, GB1), the power supply potential (VDD) is applied to the drain, and the input voltage (for example, VG1) is received at its own gate. In the p-channel MOS transistor (Q2), its own source and back gate are connected to the output terminal (Y) of this operational amplifier, the ground potential (VSS) is applied to the drain, and the input voltage (for example, VG1) is received at its own gate.

Next, the internal configuration of the response-speed increase circuit SP2 will be described extracted from the response-speed increase circuits SP1 to SP9 with reference to FIG. 5 and FIG. 6.

Figure 5:
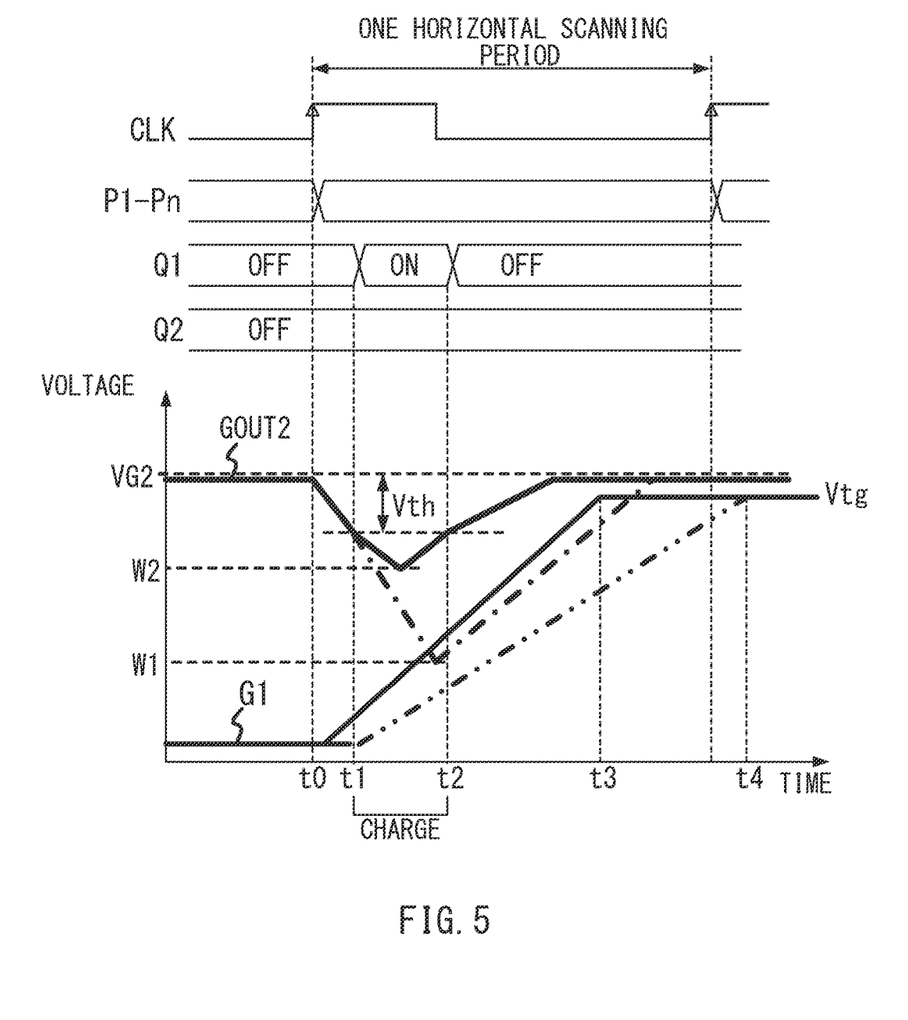
FIG. 5 is a waveform diagram for describing an operation of a response-speed increase circuit.

FIG. 5 is a waveform diagram illustrating correspondence among a waveform of the gamma reference voltage GOUT2 temporarily fluctuated in a decreasing direction, the states of the transistors Q1 and Q2, and a waveform of the pixel drive signal G1 whose level increases according to the pixel data P1 and reaches a target electric potential Vtg.

That is, when the pixel data P1 to Pn varies corresponding to the clock signal CLK at a time point t0, the voltage value of the gamma reference voltage GOUT2 temporarily decreases due to the influence of the load change in accordance with the state transition of the decoder E2 as illustrated in FIG. 5 in some cases.

Here, when the response-speed increase circuit SP2 illustrated in FIG. 3 is not disposed, the voltage value of the gamma reference voltage GOUT2 decreases to a voltage value W1 as indicated by a one-dot chain line of FIG. 5, and subsequently gradually increases to reach the original voltage value, that is, the voltage value corresponding to the reference voltage VG2. Thus, when the voltage value of the gamma reference voltage GOUT2 decreases to the voltage value W1, the level increase speed of the pixel drive signal G1 generated based on the gamma reference voltage GOUT2 is lowered. Accordingly, as indicated by a two-dot chain line of FIG. 5, the time point at which the level of the pixel drive signal G1 reaches the target electric potential Vtg after the start of the level increase possibly delays to a time point t4 exceeding one horizontal scanning period.

Meanwhile, when the response-speed increase circuit SP2 is disposed, as illustrated in FIG. 5, the transistor Q1 turns ON at a time point t1 at which a difference between the voltage value of the gamma reference voltage GOUT2 and the reference voltage VG2 exceeds a threshold Vth of the transistor Q1.

Accordingly, the transistor Q1 applies the power supply potential VDD to the voltage supply line L2 to charge the voltage supply line L2, thus suppressing the decrease of the gamma reference voltage GOUT2.

Therefore, as indicated by a thick solid line of FIG. 5, the decrease of the gamma reference voltage GOUT2 stops at a voltage value W2 higher than the voltage value W1, and then the gamma reference voltage GOUT2 increases. During this period, at a time point t2 at which the difference between the voltage value of the gamma reference voltage GOUT2 and the reference voltage VG2 decreases to the threshold Vth or less, the transistor Q1 turns OFF and the charge operation stops.

Accordingly, since this charge operation allows suppressing the decrease of the gamma reference voltage GOUT2 compared with the case where the response-speed increase circuit SP2 is not disposed, the voltage value of the gamma reference voltage GOUT2 can be quickly returned to the same voltage value as the reference voltage VG2. Accordingly, as illustrated in FIG. 5, the level of the pixel drive signal G1 can be reached to the target electric potential Vtg at a time point t3 earlier than the time point t4.

Figure 6:
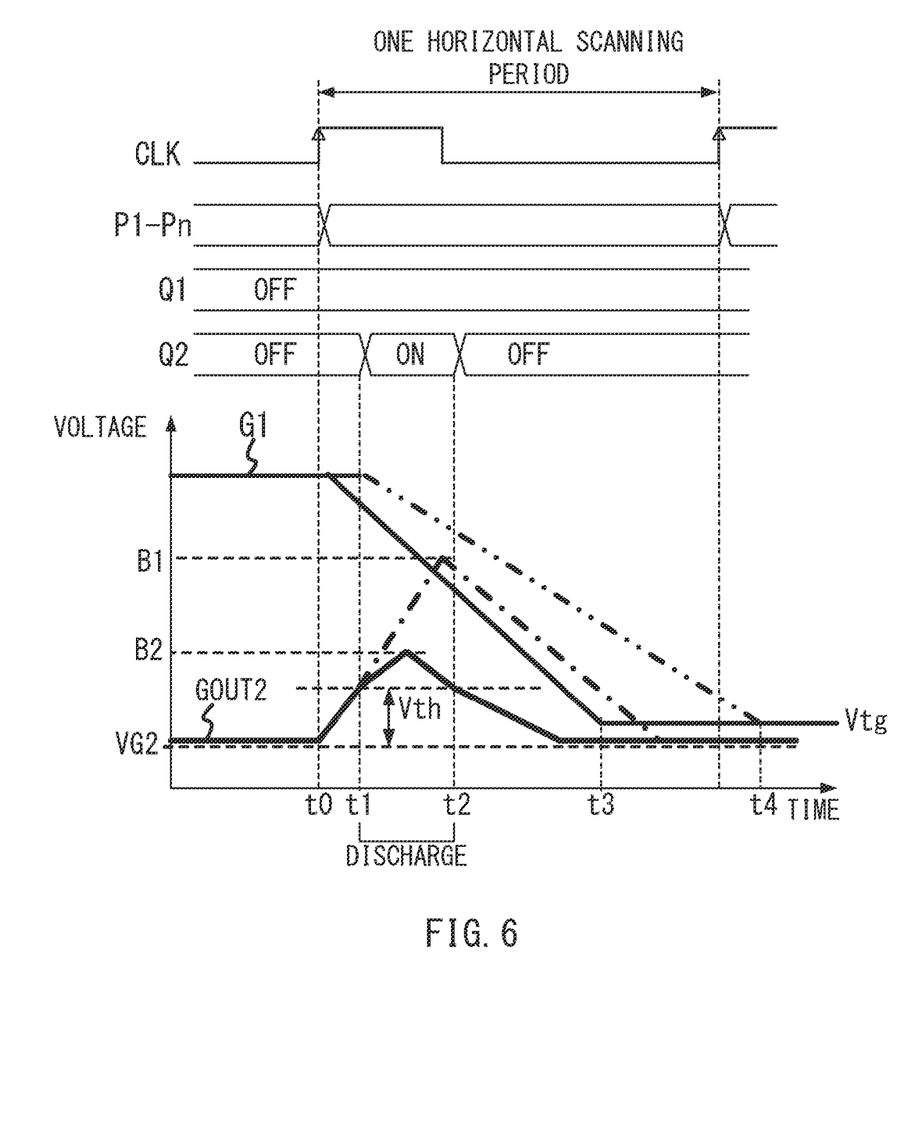
FIG. 6 is a waveform diagram for describing the operation of the response-speed increase circuit.

FIG. 6 is a waveform diagram illustrating correspondence among a waveform of the gamma reference voltage GOUT2 temporarily fluctuated in an increasing direction, the states of the transistors Q1 and Q2, and a waveform of the pixel drive signal G1 whose level decreases according to the pixel data P1 to Pn and reaches a target electric potential Vtg.

That is, when the pixel data P1 to Pn varies corresponding to the clock signal CLK at a time point t0, the voltage value of the gamma reference voltage GOUT2 temporarily increases due to the influence of the load change in accordance with the state transition of the decoder E2 as illustrated in FIG. 6 in some cases.

Here, when the response-speed increase circuit SP2 illustrated in FIG. 3 is not disposed, the voltage value of the gamma reference voltage GOUT2 increases to a voltage value B1 as indicated by a one-dot chain line of FIG. 6, and subsequently gradually decreases to reach the original voltage value, that is, the voltage value corresponding to the reference voltage VG2. Thus, when the voltage value of the gamma reference voltage GOUT2 increases to the voltage value B1, the level decrease speed of the pixel drive signal G1 generated based on the gamma reference voltage GOUT2 is lowered. Accordingly, as indicated by a two-dot chain line of FIG. 6, the time point at which the level of the pixel drive signal G1 reaches the target electric potential Vtg after the start of the level decrease possibly delays to a time point t4 exceeding one horizontal scanning period.

Meanwhile, when the response-speed increase circuit SP2 is disposed, as illustrated in FIG. 6, the transistor Q2 turns ON at a time point t1 at which a difference between the voltage value of the gamma reference voltage GOUT2 and the reference voltage VG2 exceeds a threshold Vth of the transistor Q2.

Accordingly, the transistor Q2 applies the ground potential VSS to the voltage supply line L2 to discharge the electricity from the voltage supply line L2, thus suppressing the increase of the gamma reference voltage GOUT2.

Therefore, as indicated by a thick solid line of FIG. 6, the increase of the gamma reference voltage GOUT2 stops at a voltage value B2 lower than the voltage value B1, and then the gamma reference voltage GOUT2 decreases. During this period, at a time point t2 at which the difference between the voltage value of the gamma reference voltage GOUT2 and the reference voltage VG2 decreases to the threshold Vth or less, the transistor Q2 turns OFF and stops the discharge process.

Accordingly, since this discharge process allows suppressing the increase of the gamma reference voltage GOUT2 compared with the case where the response-speed increase circuit SP2 is not disposed, the voltage value of the gamma reference voltage GOUT2 can be quickly returned to the same voltage value as the reference voltage VG2. Accordingly, as illustrated in FIG. 6, the level of the pixel drive signal G1 can be reached to the target electric potential Vtg at a time point t3 earlier than the time point t4.

Thus, in the gradation voltage generation unit 133 illustrated in FIG. 3, the response-speed increase circuits SP1 to SP9 are disposed, thereby suppressing the amounts of fluctuation of the gamma reference voltages GOUT1 to GOUT9 due to the significant fluctuation of the currents flowing in the loads (decoders E1 to En). Therefore, since the amounts of fluctuation of the gradation voltages V1 to V256 obtained by dividing the gamma reference voltages GOUT1 to GOUT9 are reduced, accordingly, the speeds of rising or falling of the levels of the respective pixel drive signals G1 to Gn appeared in each horizontal scanning period are increased. That is, by disposing the response-speed increase circuits SP1 to SP9, the pixel drive signals G1 to Gn capable of driving the display device 20 at high speed can be obtained.

Furthermore, with the response-speed increase circuits SP1 to SP9 illustrated in FIG. 3, the power consumption and the heat generation amount can be reduced compared with a case where internal operating currents of the respective gamma buffers GB1 to GB9 are increased to suppress the voltage fluctuation caused in the gamma reference voltages GOUT1 to GOUT9. To increase the internal operating current of the gamma buffer, it is necessary to increase the sizes (gate widths) of the respective transistors constituting the gamma buffer to ensure the saturated operation margins of the transistors at low-voltage. In contrast, in the gradation voltage generation unit 133, while the circuit size increases by the sizes of the response-speed increase circuits SP1 to SP9, the increment of the circuit size is small compared with the case where the sizes of the transistors in each of the gamma buffers are increased.

Accordingly, employing the gradation voltage generation unit 133 illustrated in FIG. 3 allows driving the display device 20 at high speed without the increase of the heat generation amount, the power consumption, and the device scale.

In the example illustrated in FIG. 3, the response-speed increase circuit SP including the two transistors Q1 and Q2 is disposed in each of the gamma buffers GB1 to GB9.

However, the gamma reference voltage GOUT5 corresponding to the reference voltage VG9 having the largest voltage value in the reference voltages VG1 to VG9 does not fluctuate to be higher even though its voltage value fluctuates in the direction lower than the reference voltage VG9 due to the load change. The gamma reference voltage GOUT1 corresponding to the reference voltage VG1 having the smallest voltage value in the reference voltages VG1 to VG9 does not fluctuate to be lower even though its voltage value fluctuates in the direction higher than the reference voltage VG1 due to the load change.

Therefore, the transistor Q1 in the transistors Q1 and Q2 may be removed from the response-speed increase circuit SP1, and the transistor Q2 in the transistors Q1 and Q2 may be removed from the response-speed increase circuit SP9.

Figure 7:
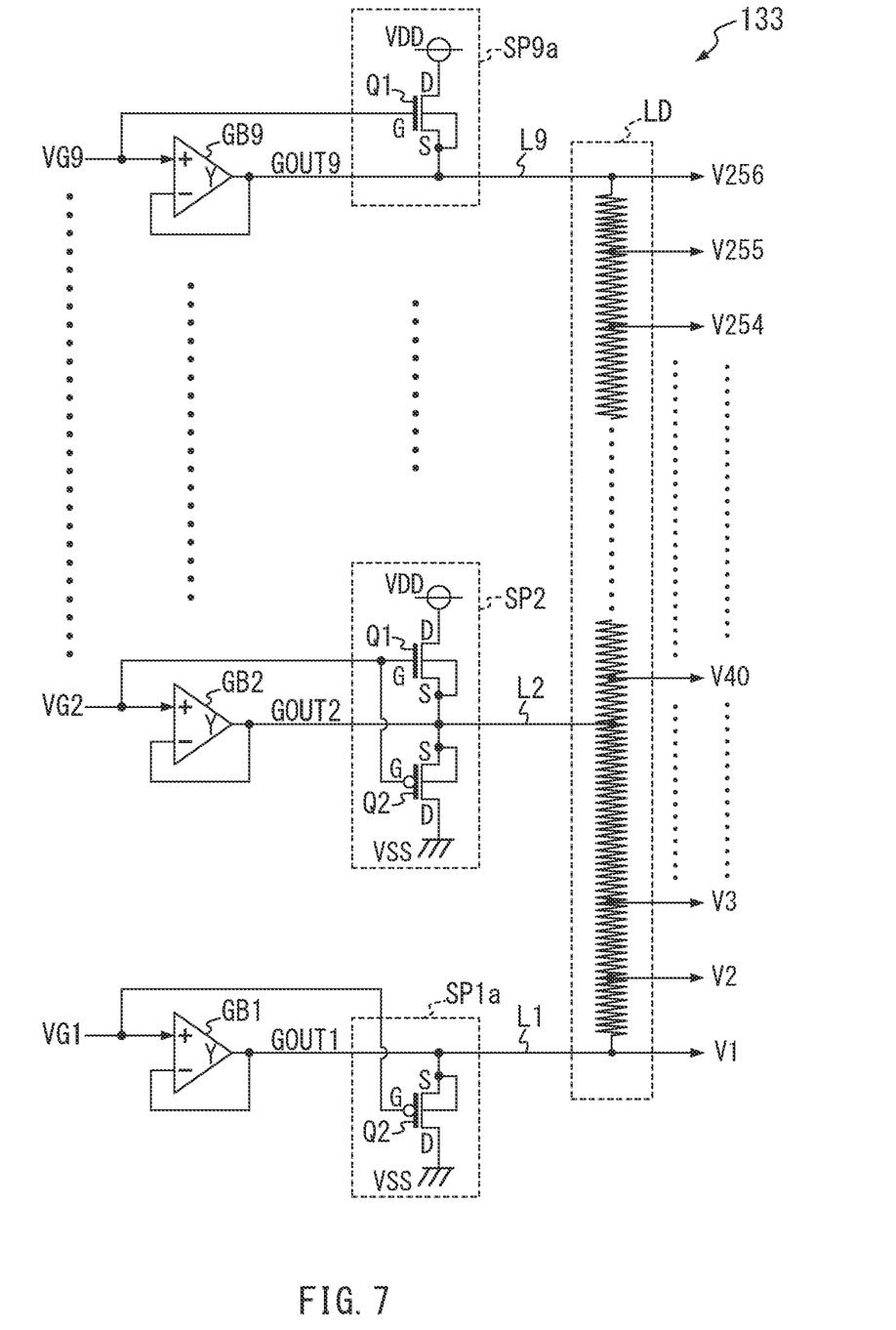
FIG. 7 is a circuit diagram illustrating another exemplary internal configuration of the gradation voltage generation unit.

FIG. 7 is a circuit diagram illustrating another exemplary internal configuration of the gradation voltage generation unit 133 configured in consideration of such a point.

The configuration illustrated in FIG. 7 is the same as that illustrated in FIG. 3 except that a response-speed increase circuit SP1a from which the transistor Q1 is removed is employed instead of the response-speed increase circuit SP1 illustrated in FIG. 3 and a response-speed increase circuit SP9a from which the transistor Q2 is removed is employed instead of the response-speed increase circuit SP9.

Employing the configuration illustrated in FIG. 7 reduces the circuit size by the size of the removed two transistors (Q1, Q2) compared with the case of employing the configuration illustrated in FIG. 3.

Basically, it is only necessary that the gradation voltage generation unit and the decoder unit below are included in the source driver 13 configured to generate the pixel drive signals G1 to Gn that drive the display device 20 in response to the pixel data pieces P1 to Pn representing the luminance levels of the respective pixels.

That is, the gradation voltage generation unit (133) includes the first to the k-th amplifiers (for example, GB1 to GB9) that individually receive the first to the k-th reference voltages (for example, VG1 to VG9) having the mutually different voltage values, individually amplify the first to the k-th reference voltages, respectively with the gain 1, and output them. Then, the gradation voltage generation unit generates the plurality of gradation voltages (for example, V1 to V256) by dividing the voltages between the respective voltages (for example, GOUT1 to GOUT5) output from these first to k-th amplifiers.

The decoder unit (for example, E1 to En) selects one gradation voltage corresponding to the luminance level represented by the pixel data piece (P) among the plurality of gradation voltages, and generates the pixel drive signal (for example, G1 to Gn) having the one gradation voltage.

Each of the first to k-th amplifiers includes the response-speed increase circuit (for example, SP1) that includes at least one transistor (Q1, Q2) in which the source and the back gate are connected to the output terminal of this amplifier, the predetermined electric potential (for example, VDD or VSS) is applied to the drain, and the reference voltage (for example, VG1) received by this amplifier is received at the gate.

Furthermore, the gradation voltage generation unit (133) includes the plurality of response-speed increase circuits (for example, SP1 to SP9) connected to the respective first to k-th amplifiers. Each of the response-speed increase circuits includes at least one transistor (Q1, Q2) in which the source and the back gate are connected to the output terminal (Y) of the amplifier, the predetermined electric potential (for example, VDD or VSS) is applied to the drain, and the reference voltage (for example, VG1) received by this amplifier is received at the gate.

DESCRIPTION OF REFERENCE SIGNS

13 Source driver
133 Gradation voltage generation unit
E1 to En Decoder
GB1 to GB9 Gamma buffer
LD Ladder resistor
Q1, Q2 Transistor
SP1 to SP9 Response-speed increase circuit

The invention claimed is:

1. A display driver that generates a drive signal for driving a display device in response to a pixel data piece that represents a luminance level of each pixel based on a video signal, the display driver comprising:
a gradation voltage generation unit that includes first to k-th (k is an integer of 2 or more) amplifiers to which first to k-th reference voltages having mutually different voltage values are individually input, the first to k-th amplifiers amplifying the first to k-th reference voltages and outputting the amplified first to k-th reference voltages, the gradation voltage generation unit generating a plurality of gradation voltages by dividing the voltages between respective voltages output from the first to k-th amplifiers; and
a decoder unit that selects one gradation voltage corresponding to the luminance level represented by the pixel data piece among the plurality of gradation voltages and generates a signal having the one gradation voltage as the drive signal, wherein
the gradation voltage generation unit includes a plurality of response-speed increase circuits connected to respective first to k-th amplifiers, and
each of the response-speed increase circuits includes at least one transistor wherein a source and a back gate of the at least one transistor are directly connected to an output terminal of the amplifier, a predetermined electric potential is applied to a drain of the at least one transistor, and the reference voltage input to the amplifier is applied to a gate of the at least one transistor.

2. The display driver according to claim 1, wherein
each of the first to k-th amplifiers is operated by supplying a predetermined power supply potential and a predetermined ground potential, and
each of the response-speed increase circuits includes:
an n-channel MOS transistor wherein a source and a back gate of the n-channel MOS transistor are connected to the output terminal of the amplifier, the power supply potential is applied to a drain of the n-channel MOS transistor, and the reference voltage input to the amplifier is applied to a gate of the n-channel MOS transistor; and
a p-channel MOS transistor wherein a source and a back gate of the p-channel MOS transistor are connected to the output terminal of the amplifier, the ground potential is applied to a drain of the p-channel MOS transistor, and the reference voltage input to the amplifier is applied to a gate of the p-channel MOS transistor.

3. The display driver according to claim 1, wherein
each of the first to k-th amplifiers is operated by supplying a predetermined power supply potential and a predetermined ground potential, and
the reference voltage having a lowest voltage value among the first to k-th reference voltages is input to the first amplifier and the reference voltage having a highest voltage value among the first to k-th reference voltages is input to the k-th amplifier, wherein
each of the response-speed increase circuits disposed in each of the second to the (k−1)-th amplifiers includes:
an n-channel MOS transistor wherein a source and a back gate of the n-channel MOS transistor are connected to the output terminal of the amplifier, the power supply potential is applied to a drain of the n-channel MOS transistor, and the reference voltage input to the amplifier is applied to a gate of the n-channel MOS transistor; and
a p-channel MOS transistor wherein a source and a back gate of the p-channel MOS transistor are connected to the output terminal of the amplifier, the ground potential is applied to a drain of the p-channel MOS transistor, and the reference voltage input to the amplifier is applied to a gate of the p-channel MOS transistor, wherein
each of the response-speed increase circuits disposed in the first amplifier includes at least only the p-channel MOS transistor among the n-channel MOS transistor and the p-channel MOS transistor, and
each of the response-speed increase circuits disposed in the k-th amplifier includes at least only the n-channel MOS transistor among the n-channel MOS transistor and the p-channel MOS transistor.

4. The display driver according to claim 1, wherein
each of the first to k-th amplifiers is a voltage follower circuit that includes an operational amplifier.

5. A semiconductor device comprising
a display driver that generates a drive signal for driving a display device in response to a pixel data piece that represents a luminance level of each pixel based on a video signal, wherein
the display driver includes:
a gradation voltage generation unit that includes first to k-th (k is an integer of 2 or more) amplifiers to which first to k-th reference voltages having mutually different voltage values are individually input, the first to k-th amplifiers amplifying the first to k-th reference voltages and outputting the amplified first to k-th reference voltages, the gradation voltage generation unit generating a plurality of gradation voltages by dividing the voltages between respective voltages output from the first to k-th amplifiers; and
a decoder unit that selects one gradation voltage corresponding to the luminance level represented by the pixel data piece among the plurality of gradation voltages and generates a signal having the one gradation voltage as the drive signal, wherein
the gradation voltage generation unit includes a plurality of response-speed increase circuits connected to respective first to k-th amplifiers, and
each of the response-speed increase circuits includes at least one transistor wherein a source and a back gate of the at least one transistor are directly connected to an output terminal of the amplifier, a predetermined electric potential is applied to a drain of the at least one transistor, and the reference voltage input to the amplifier is applied to a gate of the at least one transistor.

6. An amplifier circuit comprising:
an operational amplifier in which an inverting input terminal is connected to an output terminal of the operational amplifier itself, the operational amplifier receiving an input voltage at a non-inverting input terminal;

an n-channel MOS transistor wherein a source and a back gate of the n-channel MOS transistor are directly connected to the output terminal of the operational amplifier, a power supply potential is applied to a drain of the n-channel MOS transistor, and the input voltage is applied to a gate of the n-channel MOS transistor; and a p-channel MOS transistor wherein a source and a back gate of the p-channel MOS transistor are directly connected to the output terminal of the operational amplifier, a ground potential is applied to a drain of the p-channel MOS transistor, and the input voltage is applied to a gate of the p-channel MOS transistor.

\* \* \* \* \*